(12) United States Patent (10) Patent No.: US 8,851,992 B2
Dutilly et al. (45) Date of Patent: Oct. 7, 2014

(54) MUSIC PLAYER FOR VIDEO GAME CONSOLES AND ELECTRONIC DEVICES OPERABLE IN SLEEP OR POWER-SAVING MODES

(75) Inventors: Derek T. Dutilly, Valencia, CA (US); Quentin Wheeler, Glendale, CA (US); Daniel J. Tyrell, Studio City, CA (US)

(73) Assignee: Disney Enterprises, Inc., Burbank, CA (US)

( * ) Notice: Subject to any disclaimer, the term of this patent is extended or adjusted under 35 U.S.C. 154(b) by 1460 days.

(21) Appl. No.: 12/201,761

(22) Filed: Aug. 29, 2008

(65) Prior Publication Data

US 2010/0056272 A1 Mar. 4, 2010

(51) Int. Cl.
*G06F 17/00* (2006.01)
*G06F 1/32* (2006.01)

(52) U.S. Cl.
CPC .............. *G06F 1/3203* (2013.01); *G06F 1/329* (2013.01); *A63F 2300/636* (2013.01); *Y02B 60/144* (2013.01); *A63F 2300/6081* (2013.01); *Y02B 60/32* (2013.01)
USPC .................... 463/35; 463/24; 463/30; 700/94

(58) Field of Classification Search
CPC ..... G06F 1/3203; G06F 1/3287; G06F 1/329; G06F 1/3293; A63F 2300/6036; Y02B 60/32; Y02B 60/14; Y02B 60/16; Y02B 60/18; Y02B 60/185; Y02B 60/186

USPC ............................... 463/1, 24, 35, 30; 700/94
See application file for complete search history.

(56) References Cited

U.S. PATENT DOCUMENTS

| 7,289,393 | B2 | 10/2007 | Keller et al. | |
|---|---|---|---|---|
| 7,331,869 | B2 | 2/2008 | Blanco | |
| 7,374,490 | B2 | 5/2008 | Tahara et al. | |
| 2003/0077557 | A1 | 4/2003 | Okamoto | |
| 2003/0227473 | A1 | 12/2003 | Shih et al. | |
| 2005/0066207 | A1* | 3/2005 | Fleck et al. | 713/320 |
| 2006/0255964 | A1 | 11/2006 | Wong et al. | |
| 2007/0077991 | A1 | 4/2007 | Horigome | |
| 2008/0052493 | A1 | 2/2008 | Chang | |
| 2008/0108437 | A1* | 5/2008 | Kaarela et al. | 463/42 |

* cited by examiner

*Primary Examiner* — Michael Cuff
(74) *Attorney, Agent, or Firm* — Marsh Fischmann & Breyfogle, LLP; Kent A. Lembke

(57) ABSTRACT

A game cartridge with a game program configured to cause a computer to implement a jukebox or music playing method. The method includes displaying a listing of game modules of the game program on a display screen including a jukebox module. A selection to activate or run the music player module is received. The music player module plays music by outputting to the audio output port an audio signal based on processing of the digital music files stored in the storage medium. The method includes receiving a sleep mode initiation signal such as may be transmitted in response a magnetic sensor sensing closing of a housing or lid. The method includes responding to the initiation signal by placing the game modules except for the music player module into a sleep state, whereby the music player module continues to play music after other modules are paused.

11 Claims, 6 Drawing Sheets

MUSIC PLAYER FOR VIDEO GAME CONSOLES AND ELECTRONIC DEVICES OPERABLE IN SLEEP OR POWER-SAVING MODES

BACKGROUND OF THE INVENTION

1. Field of the Invention

The present invention relates, in general, to portable electronic devices such as handheld video game consoles or systems, and, more particularly, to methods and components for operating portable electronic devices such as video game consoles as music players or jukeboxes.

2. Relevant Background

The portable electronics industry has experienced explosive growth in recent years with consumers often owning several such devices. For example, a typical consumer may have a cell phone, a portable computer such as a laptop or notebook computer, a personal digital assistant, a digital music device, and a video game console, and anyone who has traveled recently will have noticed that many people carry and use one or more of each of these portable electronic devices. Most of these devices are battery powered and can only be used for several hours without recharging or replacement of the battery. The electronics industry continues to add features and functionality to the portable devices, but each added feature or function has the potential of shortening the life of the device's battery. Hence, there is an ongoing challenge in the portable electronics industry to provide innovative devices that can operate off their batteries for longer periods of time.

To this end, significant research and development efforts have gone into developing improved batteries. Rechargeable batteries such as lithium ion batteries are typically used in electronic devices, and the service life of a fully charged battery has been extended from several hours to six to ten hours or more. Additional research likely will continue to increase the service life of the batteries used in portable electronic devices, but such improvements are often counterbalanced by added features that use more power and drain the battery such as the addition of a second screen, providing additional processors or memory devices, and the inclusion of parallel or background operation modules or components rather than a single functioning device.

Another approach to increasing the service life of a battery-powered device is to reduce its power usage. For example, many portable electronic devices provide a graphical user interface (GUI) on a monitor or screen, and operation of such screens uses significant power. To reduce power usage, the device may be configured to enter a sleep or power saving mode after a period of non-use or no user input, and in such a sleep mode the GUI may no longer be displayed and the screen darkened to save power. Similarly, many portable electronic devices are adapted to enter a sleep or power saving mode of operation when the device is closed. Additionally, other portable electronic devices enter sleep mode through either a timeout function after a period of inactivity or can enter a user initiated sleep mode by pressing a button or touching a touch screen. For example, devices such as computers and cell phones with a clamshell body design may be configured to automatically enter a sleep mode when the lid portion is folded or snapped shut against the base portion. Likewise, popular video game consoles are provided with clamshell body designs and are typically designed to enter a sleep mode when the lid portion is closed against the base portion. In such a sleep mode, an operating game application saves its current settings and pauses all operations including terminating any display on its screen(s), and game developers have often been required by console manufacturers to provide such pausing of all game routines upon the closing of the body. While saving energy, the requirement that the running application pause during the sleep mode has limited developers' ability to create additional features and functionality for the electronic devices.

Hence, there remains a need for portable electronic devices or software/hardware components for such devices that allow the electronic devices to consume less power and have longer service or battery lives while providing additional functions or operating modes in such devices.

SUMMARY OF THE INVENTION

The present invention addresses the above problems by providing portable electronic devices such as, but not limited to, video game consoles that may be operated as portable jukeboxes or music playing devices while the electronic device is in a sleep or lower power consumption mode or state. Briefly, the electronic device may include a jukebox or music player module (e.g., software or logic) that is operable by a CPU or processor of the device to allow a user to access and listen to music that is stored in a digital format on the device (or in a game or memory cartridge inserted into or connected to the device). The jukebox module is adapted such that when the device is placed into a low power consumption mode, such as a sleep mode that may be initiated by a period of inactiveness, by a clamshell-type body or console housing being closed, or the like, the jukebox module continues to operate to send audio signals to an audio out port (e.g., an earphone or speaker jack) while other functions that may be provided by game or other program modules are placed in a sleep mode (e.g., switched from an active, high power operating state to a paused, low power operating state). In this manner, the device can continue to be used as a music player or portable jukebox even when it is in the sleep or lower power mode of operation.

In one embodiment, aspects of the invention are implemented in a game program stored in memory of a video game card, cartridge, or disc (e.g., a computer-readable storage medium). The computer-readable storage medium includes a game program stored therein that is configured to cause a computer (e.g., a processor or processors of a video game console or other portable game device) to implement a jukebox or music playing method. The computer or processor and associated circuitry/components may be provided in a game apparatus that includes a display apparatus, user input devices, and an audio output port (or connection for user earphones, headphones, speakers, or a wireless connection to remote headphones/speakers via a wireless connection interface such as Bluetooth and so on).

The method includes displaying a listing of game modules (or their names) of the game program on the display apparatus, and these modules include a music player or jukebox module. A selection to activate or run the music player module is received from a user via one of the user input devices (e.g., pressing a touch screen or the like). With the music player module, the method continues with playing music by outputting to the audio output port an audio signal based on processing of the digital music files stored in the storage medium and accessed by the music player module such as to play songs in a user's cart or on a play list displayed on the display apparatus. The method may include receiving a sleep mode initiation signal such as may be transmitted by the game processor in response to a signal from a magnetic sensor indicating closing of a clamshell housing. The method may further include responding to the initiation signal by placing the game modules except for the music player module into a sleep state, whereby the music player module continues to play music even after the other modules are paused or placed in lower power consumption operating states.

In some embodiments, the method may further include receiving user input including music player control commands (e.g., song navigation or play inputs, volume control, and the like) after the other modules have been placed in the sleep mode (e.g., by a user operating externally accessible user input devices such as switches, buttons, knobs, or the like) and in response modifying the playing of the music. In some cases, a user interface is displayed on the display apparatus that includes a play list or other information related to the stored digital music files and the method may include receiving a selection of one of these songs or names on the play list, with the playing of music including playing the selected song. In some embodiments, there is nothing displayed to the user. In some embodiments, a user interface may be displayed that includes a listing of all songs in the digital music files with an indication of which are currently accessible to the user via the music player module, and the method may then include receiving user inputs (e.g., game play inputs) which causes the music player module to modify the list of accessible songs to include additional earned song titles from the music files (e.g., the user is able to unlock songs via play of other game modules). In some embodiments, the game apparatus may be communicatively linked to another electronic device that has memory (or access to memory) storing additional digital music files, and the method may include transferring one or more of these additional files to the computer-readable storage medium for use by the music player module in the music playing step.

DETAILED DESCRIPTION OF THE PREFERRED EMBODIMENTS

Figure 1:
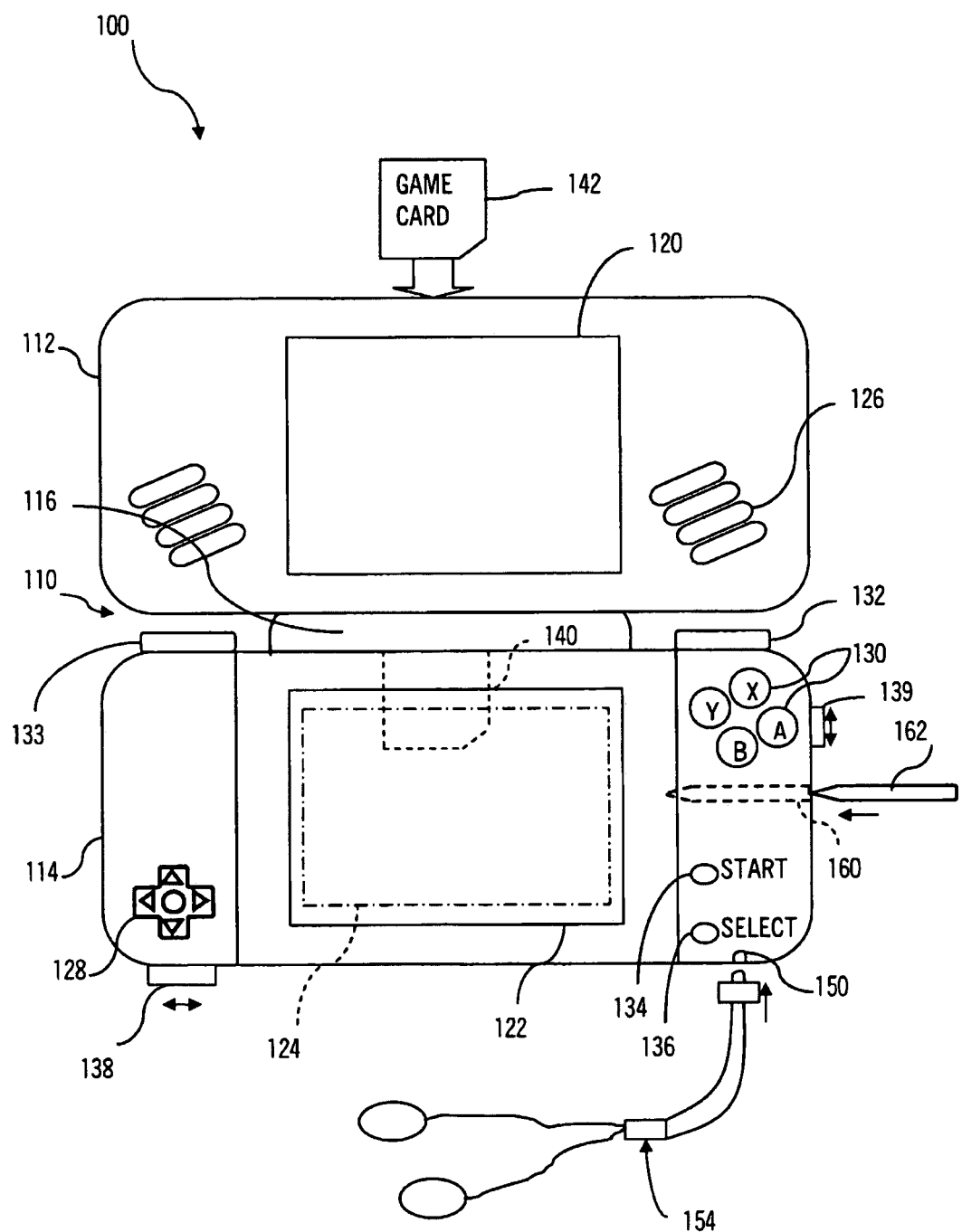
FIG. 1 illustrates a portable video game system according to an embodiment of the invention in an open position.

Briefly, embodiments of the present invention are directed toward portable electronic devices that are adapted to run as music players or portable jukeboxes when the devices are otherwise in low-power consumption or sleep operating modes or states. The electronic devices may include nearly any device that enters a sleep mode, e.g., after a period of non-use, upon receipt of user selection of such mode, or, more typically, when a clamshell body is closed (e.g., a lid or upper portion is positioned against or near a base or lower portion of the body). The devices may include computers such as laptops, notebooks, and other portable computers and may include cell phones, personal digital assistants (PDAs), and other devices that are periodically placed in low-power consumption states. The following description is intended to cover such electronic devices while emphasizing use of the sleep-mode jukebox concept with video game consoles to provide a game system that can operate as a portable jukebox or music player.

Specifically, the inventors were facing a challenge of increasing the functionality of a video game console while controlling its power consumption. It was believed that consumers would appreciate the ability to use their game consoles in a manner similar to a more typical music player such as a portable MP3 player or the like. To this end, the inventors determined that video games (e.g., game applications provided on the memory of a game cartridge or card or in a memory card that is inserted into a video game console) may be modified to include a music playing or jukebox module to allow the user of the game console to listen to music while they are playing the game.

Most portable video game consoles are designed to have little or no memory for use in storing game data. Hence, the game cartridge includes memory that is used in embodiments of the invention to not only include or store a game application with a jukebox module but also to store a plurality of songs (or digital music files such as MP3 files). The game application may be configured to provide all the music files to the user or game player or to provide a small list initially (e.g., in the user's cart) with other songs/music files being earned by game play. Typically, the user is also able to organize their music into folders and play lists and to navigate through the songs and control play similar to on other music playing devices, and these functions are provided through user interfaces/GUIs generated by the game application and/or with external user input buttons and/or switches (e.g., shoulder buttons may be used to navigate through a current play list, a volume switch on the console body may be used to set song playing volume, and so on).

Significantly, the inventors determined that it would be desirable to allow the user to listen to music even when the video game console is closed (or otherwise placed in a sleep or low-power consumption operating state). Typical video game consoles are designed to conserve battery life by entering a sleep mode whenever the console body is closed (e.g., lid placed against the base). In such sleep modes, the game applications are all paused and the screen becomes dark, with game data being stored prior to entering the sleep mode such that the game can resume at the same starting point when the video console is later opened. In contrast, the game applications of the present invention typically include a music player or jukebox module that is allowed to continue its operations when the video console body is closed (or the device is placed in a sleep mode). In some embodiments, this occurs automatically with the jukebox module acting to transmit an audio output signal only to the audio output port (or headphone/speaker port) when in such a sleep mode. In some embodiments, the screen is darkened (e.g., no user interface regarding the jukebox is displayed) in such a sleep mode while in other embodiments the screen may continue to display the same or a different interface with data or information on the currently played songs to facilitate use of the video game console as a music player.

FIG. 1 illustrates a game apparatus or system 100 of an embodiment of the invention that includes a game card 142 with a jukebox or music player module (not shown) in its memory that enables the game system 100 to be operated as a portable music player. As shown, the system 100 includes a video game console 110, a game card 142 with a game application or main game processing program with a jukebox module, and an audio output device 154 (e.g., a pair of speakers or, as shown, a pair of earphones (or headphones)). During operation, the game card 142 is inserted by a user into the game loading slot or port 140 of the console 110 and the game application on the memory of the card 142 is loaded and run by the logic and hardware (not shown in FIG. 1) provided in the video game console 110. To listen to music and operate the console 110 as a music player or jukebox, the user may insert the earphones 154 into the audio out port 150 (or use speakers 126). In preferred embodiments, the jukebox or music player module of the game application is not paused when the console 110 is placed in sleep or low power mode (such as by closing the lid or upper housing/portion 112) and an audio signal is transmitted whenever the jukebox module is selected and active in the game.

In this exemplary game system 100, the game console 110 includes an upper housing or lid 112 connected by a hinge or pivotal member 116 to a lower housing 114 (e.g., a clamshell body design in which the lid 112 may be closed and opened by pivoting about hinge 116 to contact base 114). The console 110 includes a first display or screen 120 in the lid 112 and a second display or screen 122 in the base 114, and each of these may be liquid crystal displays (LCDs) or other display screens. Two or dual screens 120, 122 are shown in system 100, but more or fewer screens may be provided with some embodiments including only a single screen in some cases. During operation of the console, game information including information in user interfaces or graphical user interfaces (GUIs) related to the jukebox module, e.g., songs available in a player's cart, a current play list, the currently playing song, and so on, is displayed upon one or both of these displays 120, 122.

During operation to play a game application on game card 142, the console 110 operates to emit sounds related to the game action. Further, as significant to the present invention, the game application provided in memory of card 142 includes a jukebox module or routine that may be activated or chosen to play songs (again stored, in most cases, in memory of card 142). To this end, the console 110 includes speakers 126 (or sound emission holes/openings) shown in this example in the lid or upper housing portion 112 (but may be in the lower portion or base 114). The game sounds and music may also be provided to a user via audible output devices connected to an audio output 150, such as the earphones 154 plugged into console base 114, speakers, headphones, or the like. For example, the speakers 126 may be used as output by the game application/music player until a device 154 is connected to audio output 150, and in some embodiments, the jukebox or music player module of a game application provides audio output signals to port 150 when the game system 100 is operating in sleep or low power consumption modes (e.g., when the console 110 is closed).

Figure 2:
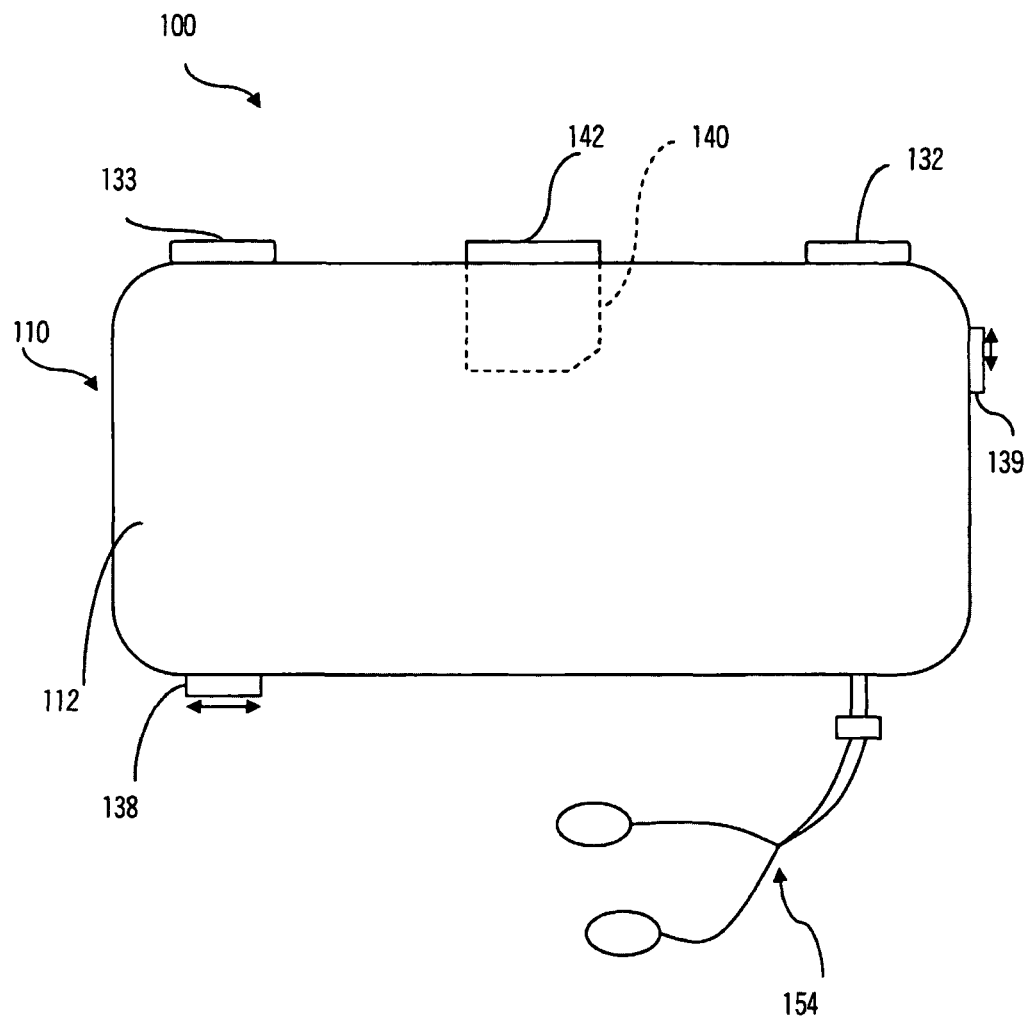
FIG. 2 illustrates the portable video game system of FIG. 1 in a closed position (or a portable jukebox or music player position)

Regarding entry of sleep mode, the console 110 includes an upper lid 112 and a base 114 that are rotatably or pivotally connected via hinge member 116. Accordingly, when the game is not being played, the upper housing or lid 112 may be folded in clamshell fashion. When the closing occurs when the game application is running on console 110, a sleep mode is set as described later in which an active or selected jukebox or music player module continues to operate (but, typically, without the screens 120, 122 being used to display music data or navigation interfaces) while other game modules are paused to lower power consumption. FIG. 2 illustrates the game system 100 with the console 110 in the closed position with the lid 112 folded upon the base 114. In some embodiments, the user may not be able to adjust or change music playing when the console 110 is closed. In other embodiments, though, the user may be able to change at least some functions of the jukebox such as by adjusting volume of output music via earphones 154 such as by sliding a volume control lever or switch 138 provided on an external surface of the console 110 such as on a side of the base 114 as shown in FIGS. 1 and 2. Further, the user may be able to terminate operations completely by shutting down the device 100 by using power lever or switch 139 also provided on a side of the base 114 and accessible when the game console 110 is closed. Further, in some embodiments, a user is able to navigate (e.g., play the next song or play the last song or the like) within a current song play list by using shoulder buttons 132, 133 provided on a side (or shoulders) of the base 114 and, again, accessible when the game console 110 is closed.

To allow a user to interact with the game application (e.g., play the game and use the music player), a number of operating switches or buttons are provided on the console 110. In this example, the console 110 includes directional input pad or button 128 that may function as a digital joystick and is utilized by a player for providing user input to instruct a moving direction of a player character (or a player object) to be operated within a running game application by operating any one of four depression portions/directional arrow sections. Action switches/buttons 130 are provided to allow a user to cause particular actions within a running game (e.g., running, jumping, holding, and the like) by pressing one or more of the buttons 130. Likewise, shoulder buttons 132, 133 may be used to cause desired actions of a character or character object within a game and, in some cases, to navigate and select options (e.g., game play modes) a user interface or GUI displayed upon one or more of the screens/displays 120, 122. The console further includes a start switch or button 134 and a select button or switch 136 to provide input to a running game.

Further, in this embodiment, the display screen 122 includes a touch panel/screen 124 (e.g., a resistance film system, an optical system, an electrostatic capacitive coupling system, or the like). In operation of a game application on game card 142, a GUI or game information is displayed upon the display 122 and the touch panel 124 operates to detect coordinates of where a user has touched the screen 122 to provide user input such as to select a displayed operating mode (e.g., activate the jukebox or music player, choose a music folder, play a song on a play list, and so on). User input may be provided with a stylus, pen, or stick 162 stored in base 114 in receptacle 160 or with a finger or the like used to depress, touch, or otherwise contact the screen 122, and in response, the touch screen 124 outputs coordinate data corresponding to the detected touch location to the game application.

Figure 3:
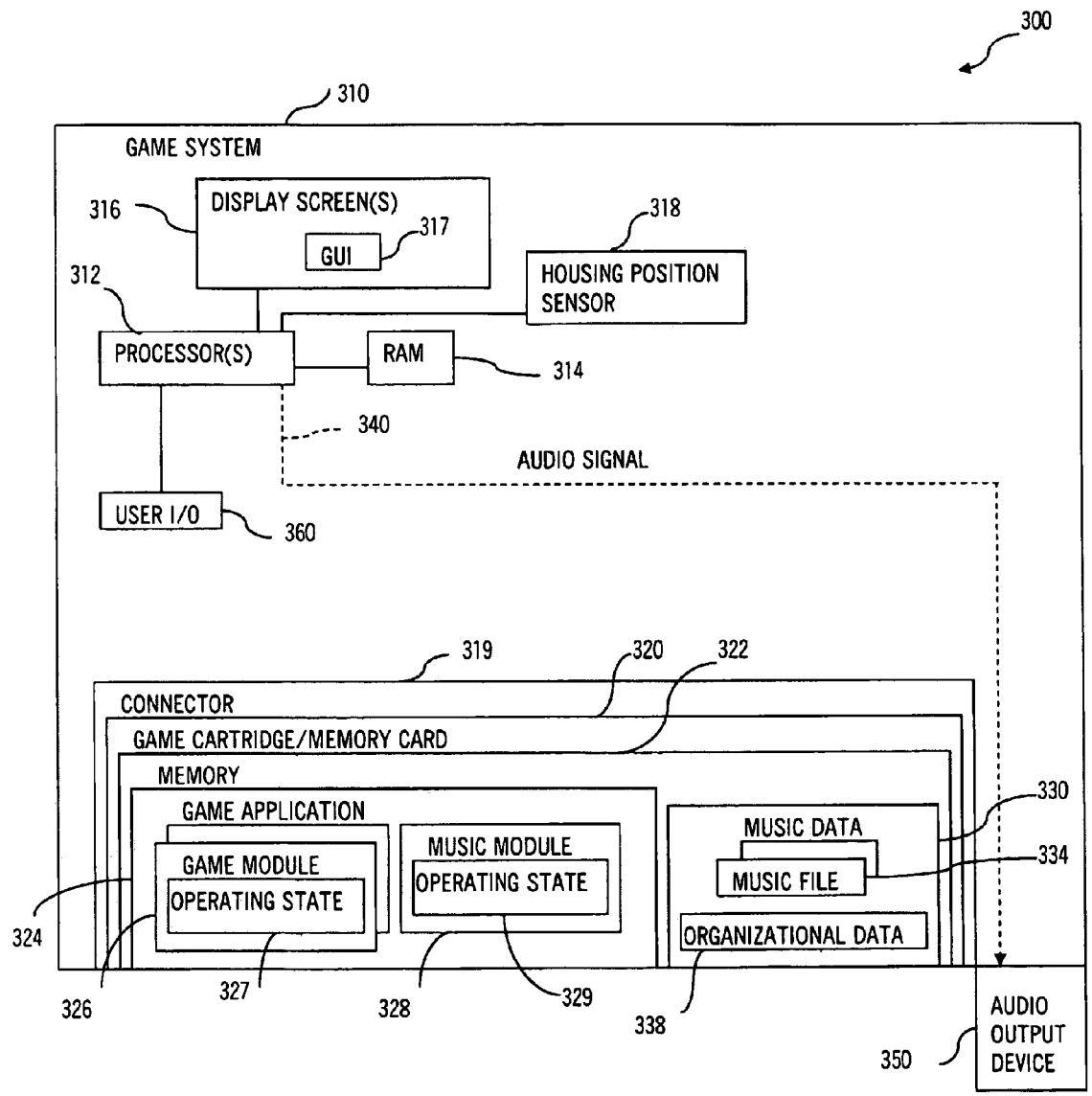
FIG. 3 illustrates in functional block form a video game system adapted for use as a portable jukebox or digital music playing device.

FIG. 3 illustrates a portable music player system 300 in functional block form to provide further description on how game systems such as system 100 may be implemented to operate as portable jukeboxes or music players. As shown, system 300 includes a game system or apparatus 310 with one or more processors or CPUs 312 that control operation of the game system 310. Memory 314 in the form of RAM or the like is provided in the system 310 for use by the processor 312 during running of a game application (temporary or transient data and the like) but not for storing game and music data and the like, which is stored in an inserted game card or memory cartridge 320 (e.g., the game system 310 is configured with little or no onboard memory but instead memory including game application logic and digital music files are provided on received memory cards and the like).

The game system 310 also includes one or more display screens 316 upon which game data may be provided and upon which user interfaces 317 are generated to allow a user to provide input via one or more user I/O devices 360 (e.g., touch screens, action buttons, joysticks, and the like). The game system 310 also includes a housing position sensor 318 (e.g., a magnetic sensor or the like) that operates to sense when a housing that may be a clamshell design is closed, which indicates the system 310 may enter a sleep or low power consumption operating state or mode. In other embodiments, a switch or other input device may be provided to allow a user to select a low power or sleep mode (e.g., in an electronic device that does not have a lid that closes such as many current cell phone and PDA designs) or logic may be provided to determine when a period of non-use has occurred and place the system 310 in sleep mode to save power (e.g., after 30 seconds, 1 minute, or some other time period, the game system 310 may enter a sleep mode including darkening a display screen, pausing game and other operating modules but continuing operation of an active jukebox or music player, and the like).

The game system 310 includes a connector or port/receptacle 319 connected to the processor 312 for receiving a game cartridge or memory card 320. The game cartridge 320 includes logic and data (such as music files in MP3 or another format) used by the game system 310 to allow a user of the system 310 to play a game and, in this embodiment, to use the system 300 as a portable music player. To this end, the game cartridge 320 includes memory 322 that stores a game application 324, such as an interactive video game or the like. The game application 324 may include a plurality of game modules 326, and the processor(s) 312 operates to run the modules 326 of the game application 324 to allow a user to play a game, and this typically includes displaying game data upon the display screens 316 that may include game menus and other GUIs 317. The game modules 326 may also cause the processor 312 to output audio signals 340 to an audio output device 350 (e.g., speakers provided on a game console/body, earphones or the like plugged into an audio out port, or the like).

The game application 324 further includes a music player or jukebox module 328 that includes logic (e.g., coded software) that may be run by processor 312 to play music or songs by outputting audio signals 340 to audio output device 350. To this end, the memory 322 also stores music data 330 that typically includes a plurality of songs in digital form or digital music files 334. Any of a number of digital audio encoding formats may be used to practice the invention including, but not limited, to MP3 (or MPEG-1 Audio Layer 3), Dolby Digital, other MPEG formats, and the like. The memory 322 may also store other music-related data 338 such as organization data including play lists, user's music folders, and the like. In some embodiments, the music module 328 may be configured such that a player of the game application 324 is provided a smaller subset of the music files 334 at the beginning of the game play but can earn or find additional ones of the music files 334 that can be added to their play lists or to their cart for later access and playing to device 350.

In some embodiments, the number/content of the music files 334 is fixed at the time of manufacture of the game cartridge 320. The user may access, navigate, and organize the files 334 (or at least those currently added to their cart) via interfaces 317 generated by the music module 328 and/or by other game modules 326. In other embodiments, a user may store additional music files in their music data 330. For example, a user may be able to link to another device (e.g., a computer via a USB or other cable or via a wireless connection) to transfer music from the other device to the memory 322 (e.g., to fully or partially synchronize with another play list or the like), and, in some cases, the game application 324 and/or music player module 328 is adapted to allow the music files 334 (or those currently earned by the player) to be copied to the other device. In one embodiment, the manufacturer/distributor of the game cartridge 320 may operate a website on the Internet that may be used by a player or user of system 310 to update and add to the music files 334 (e.g., earn codes by playing the game application 324 to allow them to download additional music, interact with a website to earn or obtain new songs, purchase additional music related to or distinct from the game application 324, and the like). In another embodiment, the user could use the program to create their own musical file, which could then be accessed by the jukebox application. As will be appreciated, there are many ways the music files 334 may be modified in embodiments in which the set of music files 334 is not fixed, which allows the system 310 to be operable more similarly to other digital audio playing devices (e.g., MP3 players and the like).

Another significant aspect of the music player system 300 is that the game cartridge 320 provides the logic for playing music with the music module 328 and also provides logic and/or functionality to play the music files 334 when the game system 310 is otherwise placed in sleep or low power consumption mode. To this end, the game application 324 may track the operating states 327 of the game modules 326 as well as the operating state 329 of the music player module 328. For example, the operating states 327 may include inactive states (e.g., no power or not selected operational modes), active states (or high/standard power consumption modes) and sleep/pause states (or low power consumption modes). However, the operating states 329 of the music player module 328 may be limited to simply an active or selected state and an inactive or non-selected state because the module 328 is preferably adapted to continue its active state (or at least a subset of such active functions with some being paused or placed in sleep mode such as darkening of the screen 316 to stop display of a GUI 317 but such functionality may be provided in a game module 326).

More particularly, operation of the music player system 300 may include a user inserting the game cartridge 320 into connector 319 and powering on the system 310. The processor 312 may then load and run the game application 324 including one or more of the game modules 326 and the music module 328. In some applications, the music module 328 will also run in the background of the game application 324 (e.g., always be active upon running the game application 324) while in other applications the user may be able to selectively run or inactivate the music player module 328 (such as by selecting a button on a touch screen 316 and/or a portion of GUI 317). When the processor 312 deteimines the game system 310 should enter sleep or low power mode such as in response to signal from sensor 318 indicative of a closed/closing lid, the processor 312 may transmit a sleep or pause signal that causes the game application 324 to change the operating states 327 of the game modules 326 to the sleep mode. Typically, this involves saving current game data in memory 322 to allow the game to be restarted at the point in the game where the lid was closed or sleep mode was initiated. In contrast, the operating state 329 of the music player module 328 is not altered such that it either continues in an inactive state or in an active state in which it plays music via audio signals 340 to audio output device 350. In some embodiments, though, some functionality is altered upon a sensing of the lid closing via a signal from sensor 318, and these alterations may include outputting the signal 340 only to a peripheral device 350 rather than an onboard speaker and terminating display of a GUI 317 providing music data 338.

The specific components, electronic devices, and software modules that are used to implement the game systems of the invention such as those shown in FIGS. 1-3 may be varied widely to practice the invention with many implementations being readily apparent to those in the video game industry and in the portable or handheld electronic device industry. However, it may be useful at this point to provide more detailed discussion of one useful implementation of a game apparatus or console 400 with reference to FIG. 4 that may be used to provide a portable jukebox upon the insertion and use of a game card 480 configured according to the present invention.

Figure 4:
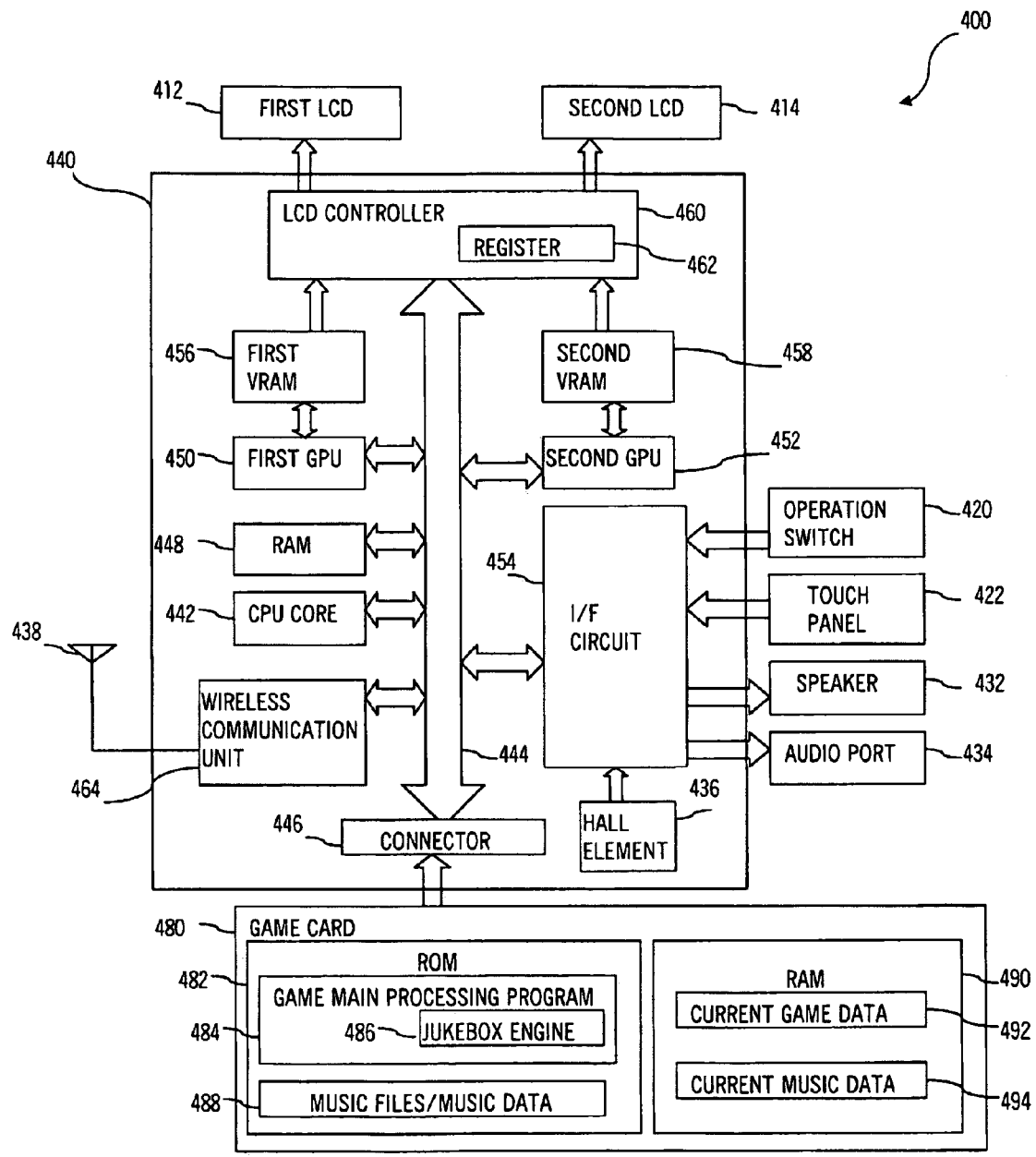
FIG. 4 illustrates schematically a video game system of an embodiment of the invention.

FIG. 4 is a block diagram showing an electric configuration of a game apparatus 400. The game apparatus 400 includes an electronic circuit board 440, and on the electronic circuit board 440, a circuit component such as a CPU core 442 is mounted. The CPU core 442 is connected to a connector 446 via a bus 444 and is connected with a RAM 448, a first graphics processing unit (GPU) 450, a second GPU 452, an input-output interface circuit or I/F circuit 454, and an LCD controller 460. The connector 446 is detachably connected to the memory or game card 480. The game card 480 includes a ROM 482 and a RAM 483, which may be connected with each other via a bus and also connected with the connector 446 such that the CPU core 442 gains access to the ROM 482 and the RAM 483.

The ROM 482 stores in advance a game program for a game (e.g., a virtual or video game) to be executed by the game apparatus 400 image data (e.g., character image, background image, item image, icon (button) image, message image, and the like), data of the sound (music) necessary for the game (sound data), and the like. Specifically, the ROM 482 is shown to store the main game processing program with its game modules and game data as well as a jukebox engine 486 and digital music files (e.g., songs) and organizational data (as discussed above) 488. The RAM (e.g., backup RAM) 490 stores or saves proceeding or current data of the game including result data and present settings of the game as shown at 492. The RAM 490 may also store current music data 494 such as a selected music folder, a play list, a currently playing song, and the like. During operation of the apparatus 400, audio signals are provided by the I/F circuit 454 to an onboard speaker 432 and/or an audio port 434 (e.g., a port or jack for earphones and the like) to output songs/audio output based on the music files 488.

The RAM 448 is utilized as a buffer memory or a working memory. For example, the CPU 442 loads the game program 484, game data, and music files/music organizational data 488, and the like stored in the ROM 482 of the memory card 480 into the RAM 448 and executes the loaded game program. Furthermore, the CPU 442 executes a game process including the jukebox engine 486 while storing data (game data, flag data) temporarily generated in correspondence with a progress of the game in the RAM 448.

The GPU 50 and the GPU 52 may form a part of a rendering mechanism and may be constructed with, for example, a single chip ASIC, and receive graphics commands from the CPU 442 to generate game image data according to the graphics commands. The CPU 442 applies an image generation program (included in the game program 484) to generate the game image data including GUIs to the GPU 450 and GPU 452 in addition to the graphics commands. The GPU 450 is connected with a first video RAM or VRAM 456, and the GPU 452 is connected with a second VRAM 58. The GPU 450 and the GPU 452 respectively access the first VRAM 456 and the second VRAM 458 to obtain data (image data: character data, texture data, and the like) for executing the graphics commands. Also, the CPU 442 writes image data for rendering to the first VRAM 456 and the second VRAM 458 via the GPU 450 and the GPU 452. The GPU 450 accesses the VRAM 456 to create game image data for rendering, and the GPU 452 accesses the VRAM 458 to create game image data for rendering.

The VRAM 456 and the VRAM 458 are connected to the LCD controller 460. The LCD controller 460 includes a register 462, and the register 462 may include, for example, one bit, and store a value of "0" or "1" (data value) according to an instruction from the CPU 442. The LCD controller 460 outputs the game image data created by the GPU 450 to the LCD 412 and outputs the game image data created by the GPU 452 to the LCD 414 in a case that the data value of the register 462 is "0". Also, the LCD controller 460 outputs the game image data created by the GPU 450 to the LCD 414 and outputs the game image data created by the GPU 452 to the LCD 412 when the data value of the register 462 is "1". Additionally, the LCD controller 460 reads the game image data from the VRAM 456 and the VRAM 458 or reads the image data from the VRAM 456 and the VRAM 458 via the GPU 450 and the GPU 452.

The I/F circuit 454 is connected to the operating switches 420, the touch panel 422, the speaker 432, and audio out port 432. For example, the operating switches 420 may be the user input devices, buttons, switches, and the like shown in the devices of FIGS. 1-3. In response to an operation of one of the operating switches 420, a corresponding operation signal (operation data) is input to the CPU 442 via the I/F circuit 454. The coordinate data output from the touch panel 422 is input to the CPU 442 via the I/F circuit 454. In addition, the CPU 442 reads from the RAM 448 the sound data and music files for the game program 484 and jukebox engine 486, such as game-play music, a sound effect or voices of a game character (onomatopoeic sound), and songs 488 from a jukebox music list, and outputs it from the speaker 432 or audio port 434 via the I/F circuit 454.

When the Hall element (e.g., a magnetic sensor) 436 detects magnetic flux of the magnet (e.g., a magnet around which a voice coil is wound in the speaker 432 or the like), the Hall element 436 outputs a voltage according to the magnetic flux. Numerical data according to the voltage is inputted to the CPU 442. As described above, when the game apparatus 400 is closed by rotating the upper housing, the Hall element 436 can detect the magnetic flux of the magnet. That is, the CPU 442 detects that the game apparatus 400 is closed (e.g., in a closed state) when the numerical data is inputted from the Hall element 436. On the other hand, the CPU 442 detects that the game apparatus 400 is opened (e.g., in an opened state) when the numerical data is not inputted from the Hall element 436.

In some embodiments, an antenna 438 is connected to the game apparatus 400, and the antenna 438 is connected to the wireless communication unit 464. For example, the apparatus 400 may be adapted to communicate with other game devices in a wireless manner to exchange music files 488 or with a computer, a server, or the like to download music files 488 to ROM 482 (or to synchronize with a music play list stored in memory of a computer). In other embodiments, a port such as a USB port may be provided to allow wired connection to such devices to allow addition or management of music files 488. The wireless communication unit 464 is connected to the CPU 442 through the bus 444. When the CPU 442 provides game data, music data, or a command to the wireless communication unit 464, the wireless communication unit 464 converts the data or commands into an analog signal, and the wireless communication unit 464 transmits or sends the analog signal in the form of a radio wave from the antenna 438. When the wireless communication unit 464 receives a radio wave transmitted from another game apparatus or other electronic device through the antenna 438, the wireless communication unit 464 separates the analog signal from the received radio wave to perform digital conversion to the analog signal, and the wireless communication unit 464 supplies the digital signal to the CPU 442. Thus, the wireless communication is performed with other game apparatuses and/or electronic devices such as another device storing MP3 files or the like.

In simple terms, when the game apparatus 400 (e.g., a video game console or its housing) is closed during playing the communication game, a closed state of the game apparatus 400 is detected. That is, as described above, the Hall element 436 detects the magnetic flux of a magnet provided in the speaker 32 or otherwise, and the Hall element 436 supplies the numerical data of the voltage to the CPU core 442 according to the magnetic flux, which allows the CPU 442 to detect the closed state of the game apparatus 400. When the CPU 442 detects the closed state, the CPU 442 determines that the game main processing program 484 or the majority of its game modules should be interrupted to set the game apparatus 400 to a sleep mode. The sleep mode is set, as discussed above, for the game modules but not for the jukebox engine, which continues to operate to provide music via I/F circuit 454 to audio port 434.

Prior to the setting of the sleep mode, the parameters (e.g., game data) necessary to execute a game main processing program 484 are saved in RAM 490 to interrupt the execution of the game main processing program 484. As described above, this enables the game to be resumed from the time point of the interruption, and this also enables the deletion of the game data due to the setting of the sleep mode to be prevented. Examples of the parameters (e.g., game data) include positional data of the player object, parameters (level, life, item, and the like) concerning the player object, and a flag concerning a game event, and so on. When the sleep mode is set, the LCD controller 460 acts to terminate or pause operation of the LCDs 412, 414. Optionally, in such sleep modes, other functions except for minimum circuit components may be turned off.

When the game apparatus 400 (e.g., its housing or console) is opened, because the Hall element 436 does not detect the magnetic flux of the magnet, the numerical data is not inputted to the CPU 442 from the Hall element 436. When the CPU 442 detects the opened state, the CPU 442 cancels the sleep mode. Specifically the CPU 442 turns on LCD displays 412, 414, retrieves saved game data from RAM 490, and initiates the game of game program 484 at the termination point. When the sleep mode is canceled, a selection screen or interface may be displayed on LCD 412 and/or LCD 414 for allowing a user to select the resumption of the game or the end of the game (or particular modules such as the jukebox module).

Figure 5:
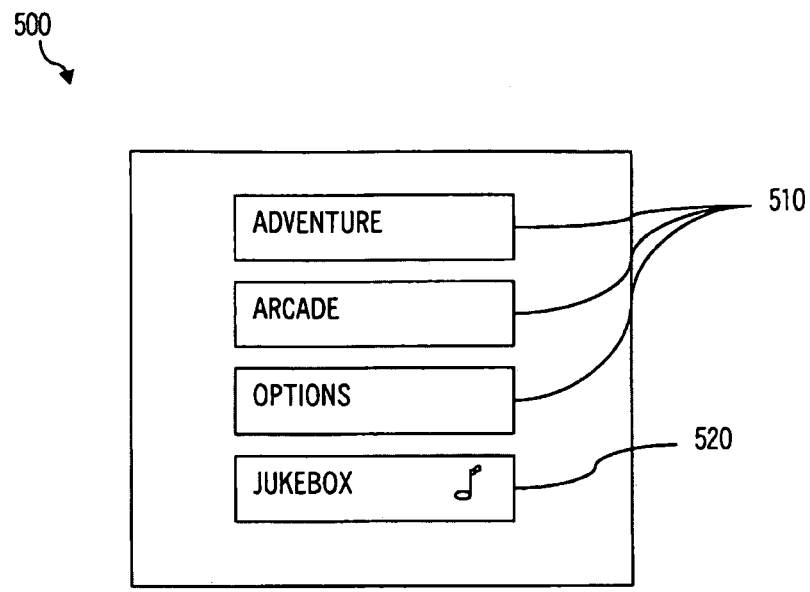
FIGS. 5 and 6 illustrate screen shots of user interfaces provided during operation of a game on a video game console or other electronic device when the game is loaded and run on the game console or electronic device to initiate jukebox or music-play operations.
Figure 6:
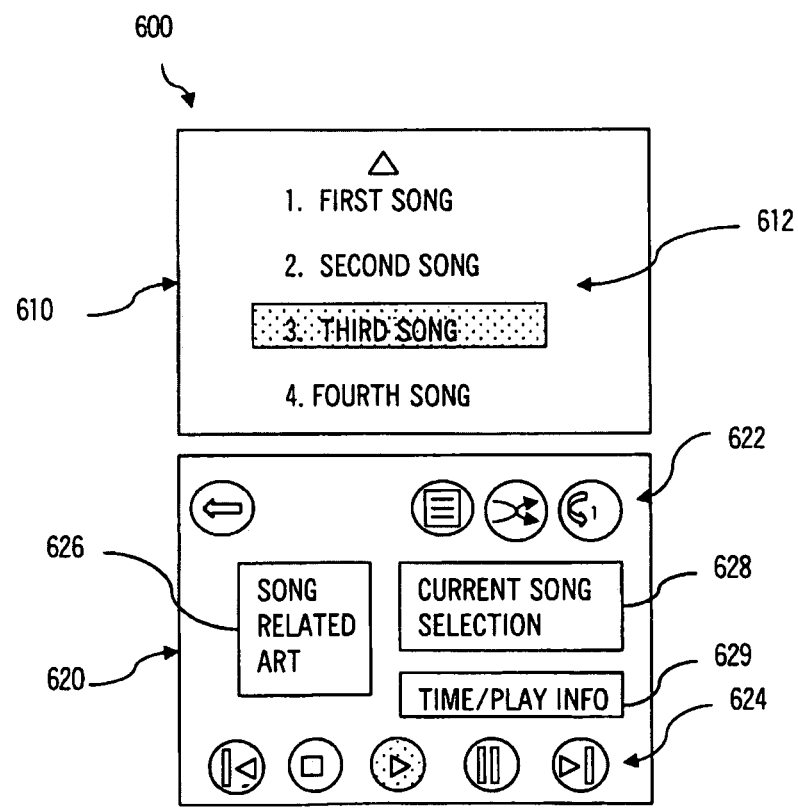

FIGS. 5 and 6 illustrate screen shots of user interfaces that may be generated by a game program of the invention on LCDs or other screens of an electronic device. The user interface 500 provides a menu or listing of buttons 510 that may be chosen (e.g., pressing an action button or touching a touch screen) by a user to activate a particular game module. Button or menu item 520 is provided to allow a user to activate or select a jukebox engine or module as discussed above (and below with reference to FIGS. 6 and 7).

Upon selection of jukebox button 520, a dual screen device 600 may operate to concurrently display the user interface 610 and the user interface 620. The interface 610 may be displayed on an upper LCD or screen (e.g., a non-touch screen display) and may include music data 612 such as a current play list (or portion of such a list). In the play list, a currently playing song may be highlighted to the user (such as with a different colored display, a box placed around or under song title, with icons, or the like). The play list 612 may also include locked songs that are available in the game memory but not yet found/earned/unlocked by the user, and the user may be encouraged to play the game and even particular portions to unlock and then access these songs.

In user interface 620, the user may be provided with information such as the current song selection in box 628, art related to the music selection in area 626, and time information related to the song in box 629. The jukebox engine may also be adapted to allow the user to control music playing functions and to navigate through available music and back to game play. To this end, the user interface 620 may include navigation buttons 622 such as a back button, a top of play list button, a next page or portion of play list button, a next page or portion of play list button, and others such as to allow a different folder to be chosen and the like. The user interface 620 may further include play control inputs, buttons, switches, or the like 624 such as a play prior song button, a stop play button, a play button, a pause button, and a play next song button.

Figure 7:
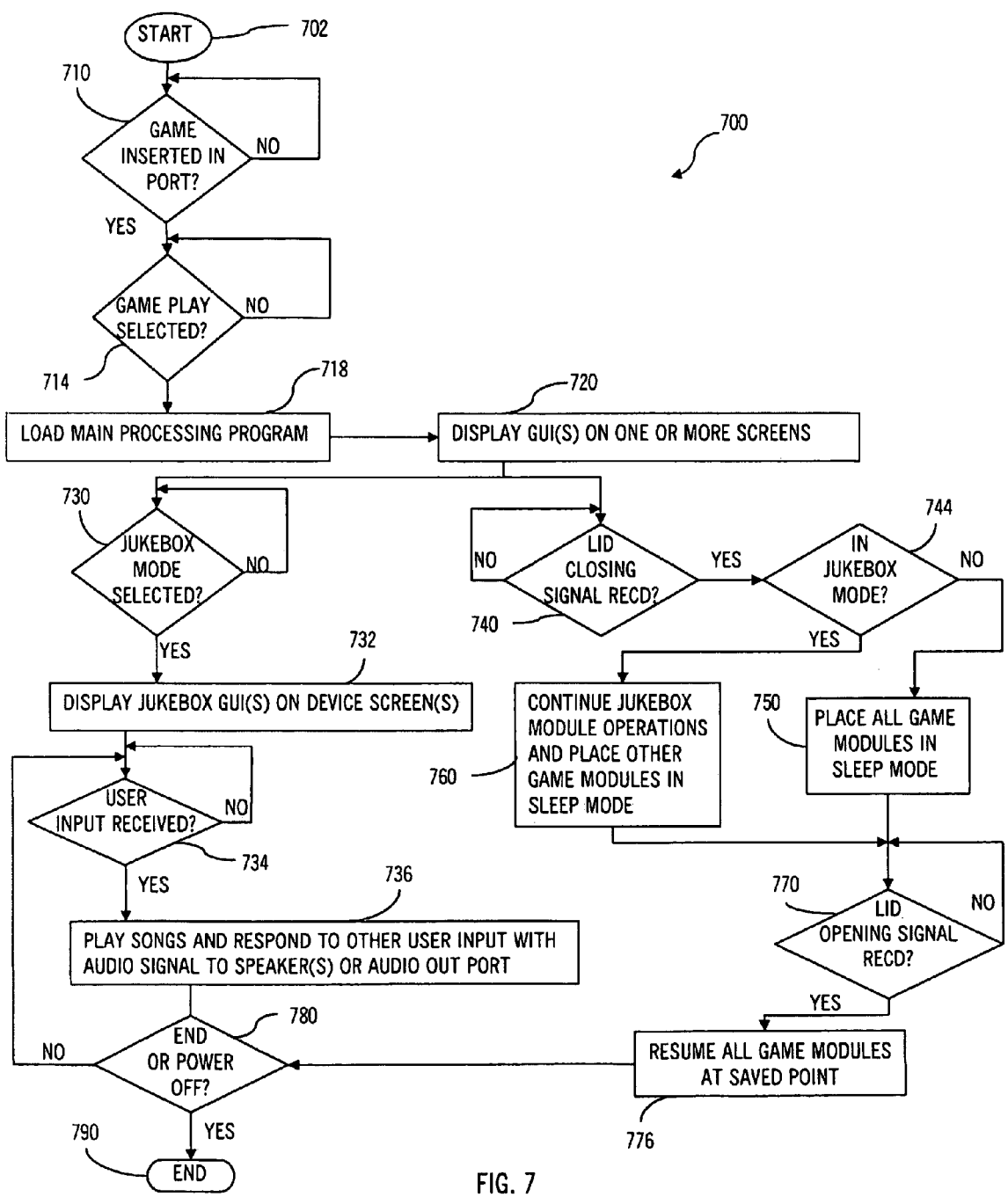
FIG. 7 illustrates a flow process for operating a video game system with a portable jukebox module of the invention provided in the game cartridge or system memory.

FIG. 7 illustrates a method 700 of operating or providing a portable jukebox according to an embodiment of the invention. As shown, the method 700 starts at 702 such as with providing a video game console and a game cartridge with memory storing a jukebox module as part of a game application or program and storing music files that can be accessed by the jukebox module and played during operation of the console (e.g., during game play, as a separate operation with the game open or closed (e.g., in full or lower power/sleep modes). The method 700 continues at 710 with detection of a game card being inserted into a game port or connection with a connector of a game console. When a game is detected and the game console is powered on, the method 700 continues at 714 with determination of whether the game play is selected (e.g., the device may be operated for other functions until a game with a jukebox module is selected). If yes, the method 700 continues at 718 with the CPU loading the main game processing program 718 and running the game application.

At 720, the method 700 continues with displaying one or more GUIs on one or more screens to provide game play options to the user (e.g., see FIGS. 5 and 6) including game modules the user can choose, allow a user to set game or device parameters, and allow a user to select or activate the jukebox module/engine. At 730, the method 700 includes the processor or CPU operating to sense or wait for selection of the jukebox mode. When the jukebox mode is chosen (such as by selection of a button on a touchscreen or the like), the method 700 continues at 732 with displaying a jukebox GUI(s) on one or more of the device screens (e.g., see FIG. 6). At 734, the processor may detect that user input is received and at 736 the jukebox engine may be run to respond to the user input such as by playing a selected song list, playing a song within a list, increasing volume, terminating or inactivating the jukebox module (with the method 700 then continuing at 720), or the like. At 780, a power off selection may be received, and the method 700 then would end at 790. Although not shown, the jukebox mode may be active while other game modules are running so as to allow a user to play a game while listening to music via the jukebox or music player module.

At 740, the game apparatus, such as with the processor, operates to wait for a signal from a lid closing/position sensor (e.g., a magnetic sensor as discussed above) indicating the lid has been closed. When received, the method 700 continues at 744 with a check or determination of whether the game program is running in jukebox mode (e.g., is the jukebox module in an active or running state of operation?). If not, the method 700 continues at 750 with placing all game modules in a sleep mode or state to conserve or consume less power. If in jukebox mode, the method 700 continues at 760 with placing all game modules except the jukebox module into sleep mode or state (e.g., pause all other game operations but continue to play music by providing a signal to the audio output port or earphone/headset/speaker jack). At 770, the method 700 continues with the processor or game apparatus operating to sense when a lid open signal is received. When received from a magnetic or other sensor, the method 700 continues at 776 with resuming the game modules at saved points in their processes (e.g., by retrieving game data saved at 750 from memory). The method 700 may then continue at 720, 730, 734, 736, 740, and/or 780.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. For example, the above discussion provides the exemplary embodiment of a handheld or portable video game console or apparatus. The invention is not limited to video game devices but may be used with nearly any electronic device that is periodically placed in a sleep or low power consumption mode. These other electronic devices include cell phones, wireless PDAs, a number of MP3 and other audio file players, portable computers such as laptops and notebooks, and other devices that are adapted to play audio files such as MP3 files (e.g., music stored in a compressed digital form). In many cases, these devices will include a clamshell-type housing with a lid and base that are positionable in open and closed positions and a sensor is included for sensing when the housing is closed or open (such as a magnetic sensor or the like). In other cases, the device could be put into sleep mode through a button press or other mechanical device that is initiated by the user. In some cases, the device could enter low power mode after initiating a period of timeout or a specified length of time without user input.

We claim:

1. A game apparatus, comprising:
a display apparatus with a computing device;
user input devices;
an audio output port; and
non-transitory computer-readable storage medium having a game program stored therein, the game program causing the computing device of the game apparatus to implement a method comprising:
displaying a listing of game modules of the game program on the display apparatus, wherein the game modules include a music player module;
receiving a selection of the music player module from a user via the user input devices;
with the music player module, playing music by outputting to the audio output port an audio signal based on digital music files stored in a memory and accessed by the music player module;
receiving a sleep mode initiation signal;
in response, placing the game modules except for the music player module in sleep states, whereby the playing music step continues after performance of the placing step by the music player module with the music player module having uninterrupted access to the digital music files in the memory;
after the placing step, receiving user input via the user input devices providing music player control commands; and
in response to the receiving of the user input, operating the music player module, which was operating prior to the receiving of the user input and without activating an additional program to control the music player module, to process the user input to modify the playing of the music based on the music player control commands.

2. The game apparatus of claim 1, wherein the sleep mode initiation signal is issued by the computer running the game program upon detecting a lid of a game apparatus that houses the computer and the storage medium being closed.

3. The game apparatus of claim 1, further comprising prior to the receiving of the sleep mode initiation signal receiving user input inactivating the music player module and then performing the placing step including maintaining the music player module in an inactive state.

4. The game apparatus of claim 1, wherein the music player control commands comprise navigation instructions selecting a prior or later song in a current play list of the digital music files.

5. The game apparatus of claim 1, further comprising prior to the receiving step, displaying a user interface on the display apparatus including a play list comprising names of each song in a set of the digital music files, receiving a selection of one of the names, and in response performing the playing music step by playing the selected song.

6. The game apparatus of claim 1, further comprising prior to the receiving step, displaying a user interface on the display apparatus including a list of accessible ones of the digital music files, receiving user input during operation of one of the game modules, and based on the received user input modifying the list of accessible ones to include additional ones of the digital music files.

7. The game apparatus of claim 1, further comprising communicatively linking the game apparatus to an electronic device with memory storing additional digital music files and transferring one or more of the additional digital music files to the computer-readable storage medium for use in the playing music step.

8. A portable electronic device for playing music, comprising:
a processor;
an audio output;
a memory storing a plurality of digital music files;
a music player operable by the processor to provide an audio signal to the audio output based on processing of the digital music files;
a clamshell housing with a lid and base pivotally connected for positioning in an open position with the lid and base spaced apart and in a closed position with the lid and base positioned proximate to each other, wherein the housing houses the processor, the memory, and the music player and wherein the music player provides the audio signal to the audio output with the clamshell housing in the open position; and a mechanism sensing the positioning of the clamshell housing in the closed position, wherein in response to the sensing of the closed position the processor continues operation of the music player to provide the audio signal without activating an additional program module to control the music player and places other program modules into a sleep mode and wherein the music player has uninterrupted access to the digital music files in the memory with the clamshell housing in the open and closed positions.

9. The device of claim 8, wherein the memory, the music player, and the other program modules are provided on a memory card, the device further comprising a connector for receiving the memory card in the housing and connecting the memory card to the processor.

10. The device of claim 9, wherein the device comprises a video game console and the other program modules comprise video game modules that are paused when in the sleep mode.

11. The device of claim 8, further comprising a display screen and the music player being operable to display a user interface including listings including identifiers for the digital music files, wherein the device includes user input devices operable by a user to provide music playing commands regarding the listings to navigate, organize, or affect the providing of the audio signal by the music player.

\* \* \* \* \*

UNITED STATES PATENT AND TRADEMARK OFFICE
CERTIFICATE OF CORRECTION

PATENT NO. : 8,851,992 B2  
APPLICATION NO. : 12/201761  
DATED : October 7, 2014  
INVENTOR(S) : Derek T. Dutilly, Quentin Wheeler and Daniel J. Tyrell It is certified that error appears in the above-identified patent and that said Letters Patent is hereby corrected as shown below:

In the Specification

Column 4, line 33, delete "on".

Column 8, line 54, delete "deteimines" and insert therefor --determines--.

Signed and Sealed this
Nineteenth Day of May, 2015

Michelle K. Lee
*Director of the United States Patent and Trademark Office*